Figure 1:
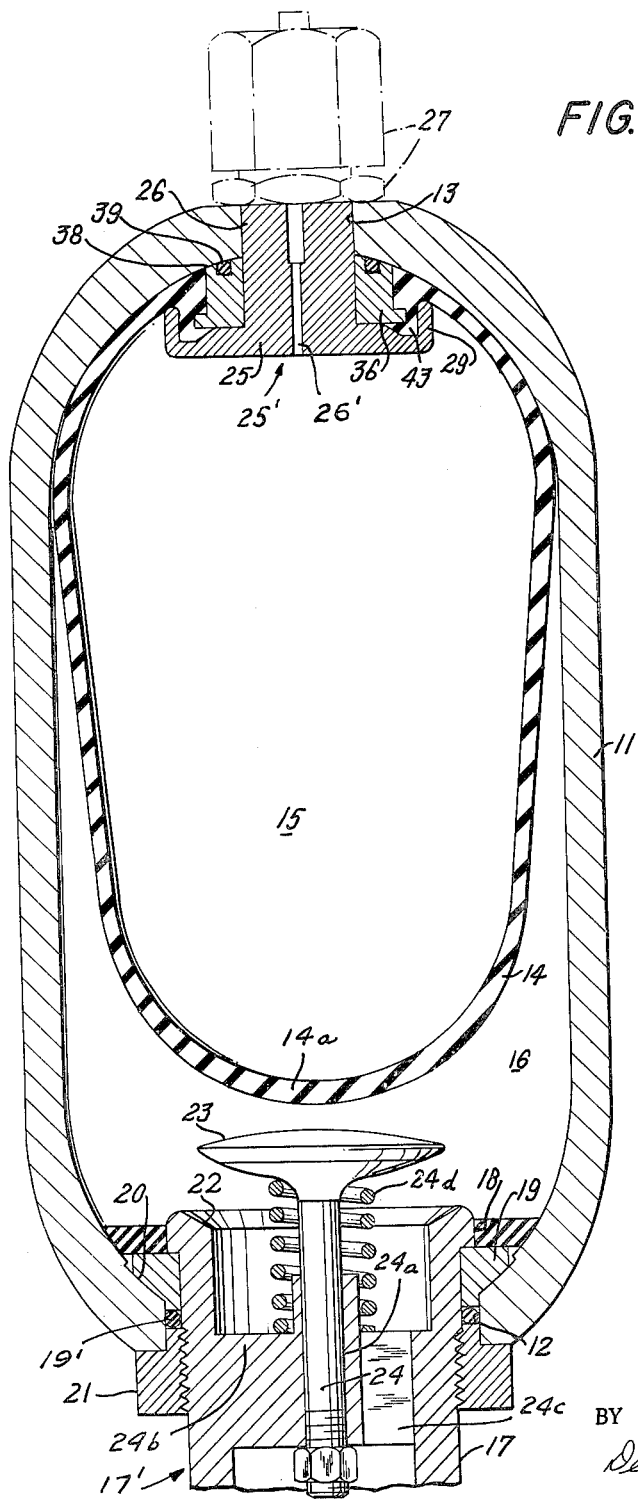

INVENTOR.
JEAN MERCIER
BY
Dean, Fairbank & Hirsch
ATTORNEYS

INVENTOR.
JEAN MERCIER
BY
Dean, Fairbank & Hirsch
ATTORNEYS

Feb. 1, 1966  J. MERCIER  3,232,318
MOUNTING MEANS FOR BLADDER OF PRESSURE VESSEL
Filed Dec. 10, 1962  4 Sheets-Sheet 4

INVENTOR.
JEAN MERCIER
BY
Dean, Fairbanks & Hirsch
ATTORNEYS

United States Patent Office 3,232,318
Patented Feb. 1, 1966

3,232,318
MOUNTING MEANS FOR BLADDER OF
PRESSURE VESSEL
Jean Mercier, 1185 Park Ave., New York, N.Y.
Filed Dec. 10, 1962, Ser. No. 243,237
Claims priority, application France, Dec. 29, 1961,
883,446, Patent 1,318,666
8 Claims. (Cl. 138—30)

This invention relates to the art of pressure vessels of the type comprising a rigid container which contains two fluids and which has a flexible deformable partition intervening therebetween and more particularly to the mounting means for such partition.

It is among the objects of the invention to provide mounting means for the deformable partition of a pressure vessel, which mounting means has but few parts which may readily be fabricated at low cost and which is strong and durable and not likely to become deranged and which may readily be assembled, securely to clamp the periphery of a deformable partition without likelihood of injury thereto so that when the mounting means is affixed in the gas inlet port of the pressure vessel, a dependable seal will be provided to prevent leakage between the gas and liquid chambers of the pressure vessel defined by the partition and also to prevent leakage from the interior of the pressure vessel, which mounting means may readily be disassembled for removal of a defective partition.

Another object is to provide an arrangement of the above type in which the periphery of the deformable partition is conformed so that it will be securely clamped at such periphery without excessive compression thereof with resultant weakening thereof, yet which will dependably be retained in place without likelihood of displacement which might cause leakage between the gas and liquid chambers of the pressure vessel with resultant inoperativeness thereof and which mounting means will so support the periphery of the partition that there will be substantially no sharp bending stress or strain imposed to said periphery which might cause weakening of the partition at such region with resultant tearing of the partition, regardless of the number of times the partition is expanded and contracted due to charging and discharging of the pressure vessel with continuous use.

According to the invention, the periphery of the deformable partition comprises a rim of substantial thickness which is compressed between the wall of the pressure vessel and the mounting means, while the main portion of the partition is separated from said periphery by a zone which is guided in substantially uncompressed condition between the pressure vessel and a rigid portion of the mounting means. Thus, all compressive stress is avoided in such zone which constitutes a working and flexing zone so that likelihood of breakdown at such zone is greatly reduced if not eliminated.

More particularly, the mounting means comprises two concentric elements and the periphery of the flexible partition is held between these elements before the mounting means is positioned in the container.

Figure 2:
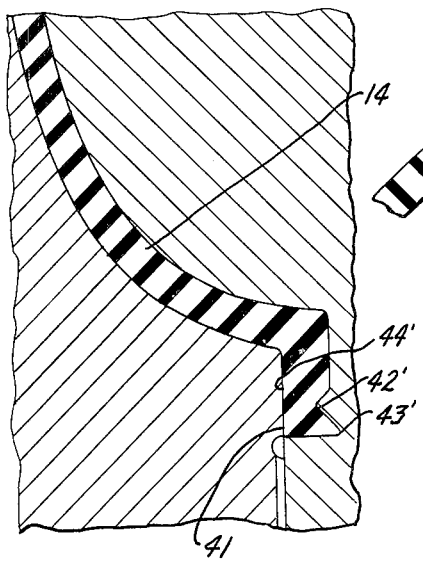
Figure 3:
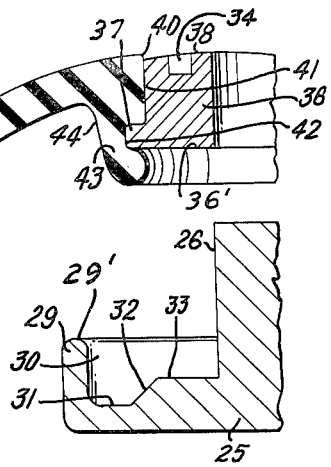
Figure 4:
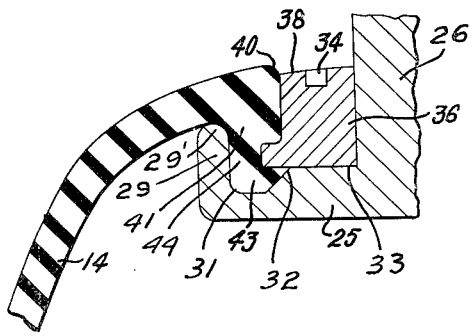
Figure 5:
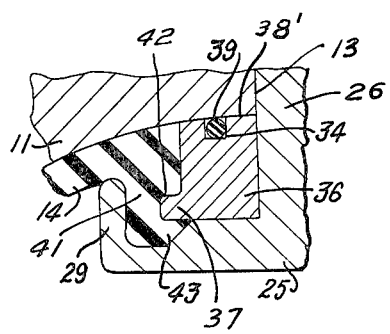
Figure 6:
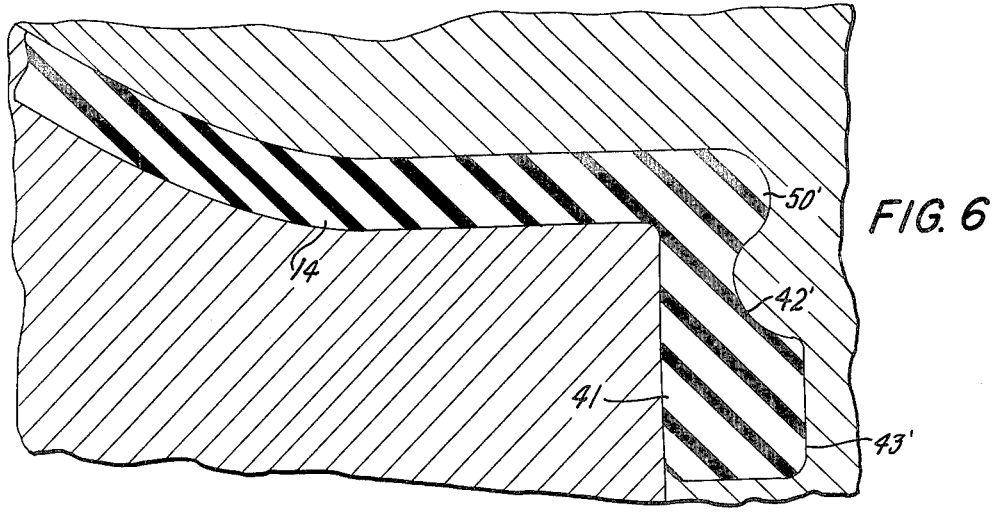
Figure 7:
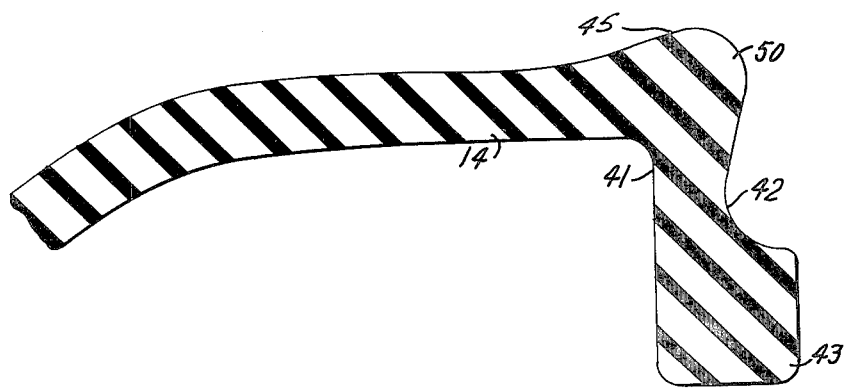
Figure 8:
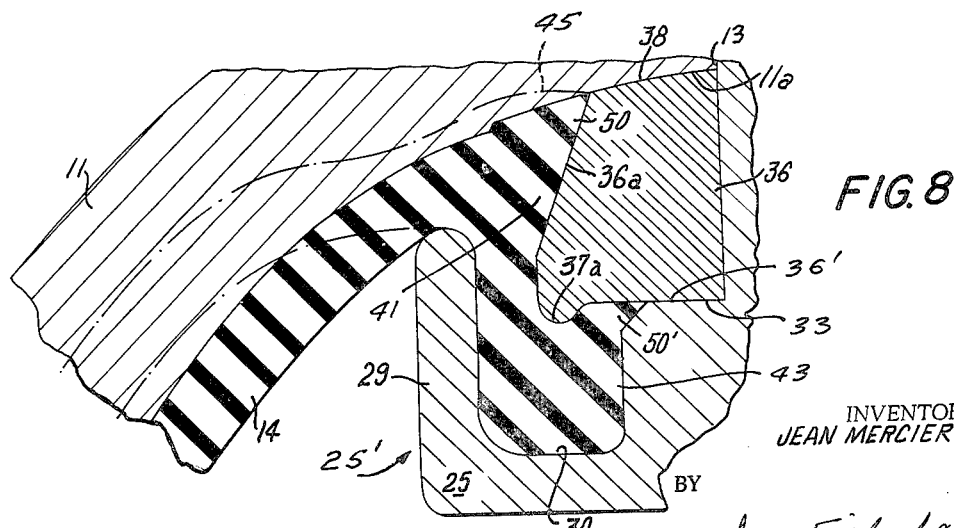
Figure 9:
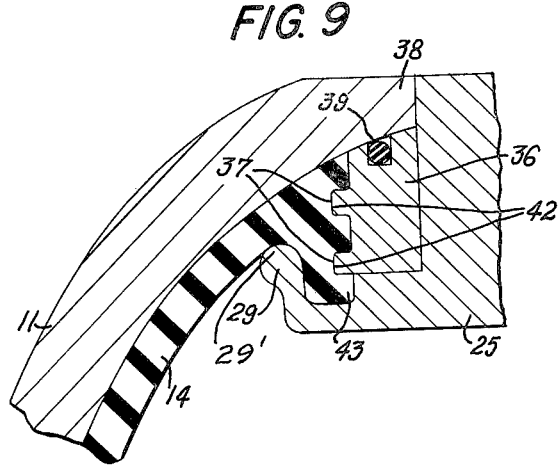
Figure 10:
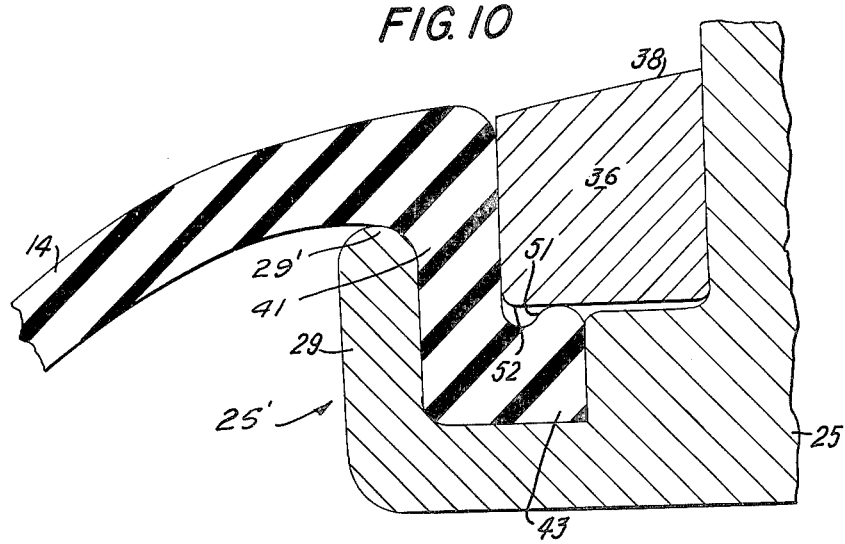

In the accompanying drawings in which are shown one or more of various possible embodiments of the several features of the invention, FIG. 1 is a longitudinal sectional view of a pressure vessel such as a pressure accumulator according to the invention, FIG. 2 illustrates the molding of the flexible partition adjacent its mouth, FIG. 3 is an exploded view of a portion of the partition and the mounting means before they are assembled together, FIG. 4 is a view of the mounting means and the partition assembled together prior to insertion into the pressure vessel, FIG. 5 is a view similar to FIG. 4, but showing the partition and mounting means in a pressure vessel, FIG. 6 is a view similar to FIG. 2 of another embodiment of the invention, FIG. 7 is a fragmentary view of a portion of the deformable partition of FIG. 6 after being turned inside out for use, FIG. 8 is a view of the embodiment of FIG. 7 clamped in position in a pressure vessel, and FIGS. 9 and 10 are views of two other embodiments of the invention.

Referring now to the drawings, in the embodiment shown in FIGS. 1 to 5, the mounting or clamping means, according to the invention, is illustratively shown incorporated in a pressure vessel, illustratively a pressure accumulator of the type comprising a container or pressure vessel 11, preferably of strong rigid material such as steel, cast aluminum or the like, capable of withstanding high pressure and having a gas inlet port 13 and an oil port 12 therein, preferably opposed to each other. The container 11 may be spherical or cylindro-spherical as shown and has a partition 14 intervening between the air inlet port 13 and the outlet port 12.

The partition is preferably a collapsible and expansible bladder 14, of resilient material such as rubber or synthetic plastic of like physical characteristics, which in distended but susbtantially unstretched condition is smaller than the cavity of the container 11. Although the bladder 14 could be of any suitable shape, as shown in FIG. 1, it desirably is substantially conical in contour along its length with the thickness of the bladder wall preferably gradually decreasing from the larger diameter or mounted end thereof shown at the top to the opposite end thereof, the latter end being preferably thickened as at 14a.

The bladder 14 has its longitudinal axis aligned with the ports 12 and 13 and defines a gas compartment 15 and a liquid compartment 16 on its opposite sides.

Although the port 12 of the accumulator could be controlled in any suitable manner, in the embodiment herein shown, it is preferred to use the general construction shown in Patent No. 2,469,171, dated May 3, 1949, by the use of which an outlet control assembly 17′ affixed in said port 12 may be removed without likelihood of injury to the mechanic.

As shown in FIG. 1, this assembly desirably comprises a housing 17, preferably a tubular member which desirably has an external annular shoulder 18 at the upper end thereof, the diameter of said shoulder 18 being smaller than the diameter of port 12. A locking member 19, illustratively a ring of greater outer diameter than said port 12 and deformable to permit its insertion thereinto and which may be of the type shown in Patent No. 2,936,787, encompasses said tubular member 17 and is seated on the rim 20 of the container 11 encompassing the port 12, the inner diameter of said ring 19 being less than the outer diameter of shoulder 18 so that said shoulder may seat on said ring. Encompassing said tubular member in juxtaposition with said port 12 is a rubber gasket 19′ which serves effectively to prevent leakage between the wall of port 12 and the outer wall of tubular member 17 when a nut 21 is screwed on the externally threaded portion of said tubular member 17.

Desirably positioned in said tubular member 17 is a poppet valve comprising a valve head 23 adapted to seat on the beveled mouth 22 of tubular member 17 and having a stem 24 preferably formed integral therewith. Stem 24 is slidably mounted in bearing bore 24a extending axially through a transverse wall 24b in the bore of tubular member 17, said wall 24b having a plurality of openings 24c therethrough to permit passage of fluid, said valve head 23 being normally retained in open position by means of a coil spring 24d encompassing stem 24 between valve head 23 and wall 24b. As the construction and operation of said outlet control assembly per se, forms no part of this invention, it will not be further described.

The invention herein resides in the mounting or clamping means 25' to retain the bladder 14 in position in the container or shell 11. As is clearly shown in FIG. 1, for example, such means comprises a circular plate or disc 25, the maximum diameter of which is less than that of the port 12 so that it may readily be passed therethrough. The disc 25 has an axial stem 26 rising therefrom, preferably formed integral therewith, said stem being externally threaded at its free end. Extending through the stem 26 and disc 25 is an axial bore 26' which is desirably internally threaded (not shown) at its outer end to receive the correspondingly threaded end of an air valve which may be a conventional "Schraeder" valve (not shown).

As shown in FIGS. 1 and 3, for example, the disc 25 has an upstanding peripheral rim 29 which defines an annular groove 30 (FIG. 3). The groove 30 has a flat bottom or floor 31 which is in the form of an annulus having its inner periphery connected by an inwardly inclined or conical wall portion 32 to a shoulder 33, the root end of stem 26 rising from the axis of said shoulder 33. The peripheral rim 29 is of height such that its upper edge 29' is positioned in a plane above that of the shoulder 33. A locking collar or ring 36 of generally cylindrical shape encompases the stem 26 and the lower end or bottom 36' of the locking ring which has an outwardly extending lateral flange 37, is adapted to seat on the shoulder 33, while the upper end or top surface 38 of the locking ring is adapted to abut against the inner surface of the container 11 adjacent the port 13 as at 38'. Desirably, the upper end of the locking ring has an annular groove 34 adapted to accommodate a gasket 39 which provides a seal with respect to the inner surface of the container to prevent any leaks in the event that there are irregularities in the inner surface of such container.

The bladder 14, which as previously set forth, is of resilient deformable material and is desirably substantially conical in contour, has an inturned or re-entrant annular rim 41 at its mouth 40, said rim being of greater thickness than the adjacent wall portion of the bladder, and being designed to fit in the groove 30 between the peripheral rim 29 and the locking ring 36.

As is clearly shown in FIG. 3, the inturned rim 41 has an internal annular groove 42 positioned between the mouth of the bladder and a bead 43 defined at the inner extremity of said rim 41. The groove 42 is of dimension such that it will accommodate the annular flange 37 on locking ring 36 while the bead 43 will engage the bottom or floor of the groove 30, being clamped between the peripheral rim 29, the floor 31 of groove 30, the conical portion 32 and also the lower end 36' of the locking ring 36. The surface 44 of the rim 41 will be encompassed by the upstanding peripheral rim 29 in the manner to be described and as clearly shown in FIG. 1.

The bladder 14 is desirably formed by molding and is then turned inside out to assume the shape shown in FIG. 3, for example.

In FIG. 2 the bladder 14 is shown during the molding operation, i.e., before it is turned inside out. During the molding of the bladder, the rim 41 protrudes outwardly rather than is re-entrant. Reference numerals 42', 43' and 44', shown in FIG. 2, correspond to the portions of the bladder after it is turned inside out for use, designated by the reference numerals 42, 43 and 44.

To assemble the unit, the clamping means 25' including the disc 25 with its integral stem 26, is first positioned within the mouth of the bladder as shown in FIG. 3. The locking ring 36 is then positioned in the mouth of the bladder so that the annular flange 37 enters the annular groove 42 as is clearly shown in FIG. 3. The disc 25 is then moved upwardly in the bladder by sliding the stem 26 thereof through the bore of the locking ring 36 until the shoulder 33 abuts against the lower end 36' of the locking ring 26. When this is done the components will be substantially in the position shown in FIG. 4 and it is to be noted that the mouth 40 of the bladder will extend beyond the upper surface 38 of the locking ring 36 to permit compression of the rim 41 when the assembly is completed.

Thereupon, the mounting means 25' including the disc 25, the locking ring 36 and the bladder 14 is inserted through the port 12 of the container which as yet has not had the outlet control assembly 17' positioned therein. The stem 26 of the mounting means 25' is passed through the port 13 and suitable locking nuts 27 are then screwed on the threaded end of the stem 26 and tightened until the upper end 38 of the locking ring abuts against the inner surface of the shell encompassing the port 13. As a result of the tightening of the nuts 27 the rim 41 of the bladder will be compressed, the amount of compression being limited by the abutment of the locking ring 36 against shoulder 33 and against the wall of the container encompassing port 13.

Since the degree of compression of the rim 41 is thus controlled by the locking ring 36, the peripheral rim 29 will rest against the bladder wall without any appreciable compression and serve merely as a guiding means.

Thus, with the arrangement above described, the bladder 14 is securely retained in place without harmful stresses.

Thereupon, the outlet control assembly 17' is positioned in port 12 in the manner clearly described in said Patent No. 2,469,171 and the equipment is ready for use.

To ready the equipment for operation, the bladder is initially charged through the "Schraeder" valve with gas under pressure so that the bladder will be inflated until it expands to assume substantially the shape of the container 11. The "Schraeder" valve is then closed. A fluid such as oil under pressure considerably greater than the pressure initially charged into the bladder is then introduced through the outlet control assembly 17' so as to enter the container 11 and compress the bladder 14 as well as the gas therein. After the container is charged, a valve (not shown) is closed to stop further flow of fluid through the outlet control assembly 17'.

Due to the difference between the pressure in the gas compartment 15 and the atmosphere, the bead 43 will be wedged between the conical portion 32 and the under-surface of the locking ring 36, which define a wedge-shaped recess therebetween to provide a highly dependable seal.

In use of the charged accumulator, the valve (not shown) which controls the outlet control assembly 17' is opened. As the poppet valve 23 is normally spaced from the seat, the bladder 14 will expand forcing the liquid through the control assembly 17'. When the bladder is expanded sufficiently to come in contact with the valve head 23, the latter will be moved against the seat 22 to close the outlet and prevent further flow of oil therefrom as well as to prevent extrusion of the bladder through the outlet closure. At this time, substantially all of the oil will have been expelled from the container.

In the embodiment shown in FIGS. 6 to 8, the arrangement is similar to that described in the embodiment shown in FIGS. 1 to 5 and the same reference numerals designate similar parts. In this embodiment the bladder 14 in its free state, i.e., after it has been turned inside out after molding, is provided with a splayed out shape as at 45 near the mouth 40. Thus, the position of the rim 41, shown in FIG. 7 for example, is very stable. Furthermore, the bladder is subjected at the time of mounting in the container, to a folding over action in forced frictional engagement against the inner wall of the container 11. In addition, the locking ring 36 has an inclined or conical outer surface 36a and the flange 37a is directed downwardly parallel to the longitudinal axis of the locking ring. The flange 37a thus forms a rim which reacts against the bead 43 at the free end of the rim 41 before the lower end 36' of the locking ring engages the shoulder 33 of the disc 25 so that after said contact is made, a beak 50' is formed that tends to be wedged in the corner defined by the disc 25 and the locking ring 36 under the action of the differential pressure between the gas compartment 15 and the atmosphere. This insures a highly dependable seal between the gas compartment 15 and the atmosphere. More particularly, the flange 37a causes compressive stresses on the bead 43 which are favorable to the engagement of the material of the beak 50' into the wedge-shaped recess or corner formed by the disc 25 and the locking ring 36.

In FIG. 6 the bladder is shown in its molded shape and FIG. 7 in its free state after it has been turned inside out. In FIG. 7 the annular groove is clearly shown at 42 and the bead at 43. By reason of the fact that during the formation of the bladder as shown in FIG. 7, the portion of the bladder adjacent the rim 41 is substantially perpendicular thereto when the bladder is turned inside out a beak 50 will be formed at the periphery of the rim 41.

This beak 50 when the bladder is mounted in the container, will be positioned in the wedge-shaped recess formed between the conical wall 36a of the locking ring 36 and the adjacent portion of the container. Desirably, the portion 11a of the container adjacent the port 13, as well as the upper end 38 of the locking ring 36 are machined, thereby assuring sufficient tightness to render it possible to eliminate the gasket 39 shown in FIG. 1. Thus, when pressure is applied, the beak 50 will be urged toward the bottom of the wedge-shaped space by the difference in pressure between the fluids and the atmosphere, the angle of the wedge-shaped recess used being one that will be particularly favorable to tightness.

In FIG. 8 there is shown in dot and dash lines a splayed out shape 45 of the bladder 14 before the mounting means 25' and bladder 14 are positioned in the container 11. In FIG. 8 it can also be seen in solid lines that the splayed out shape is bent back by the pressure of the wall of the container after the bladder is mounted therein and that the rim 41 is substantially compressed, insuring the clamping action. This arrangement contributes toward decreasing the fatigue of the bladder in the zone of fastening.

The embodiment shown in FIG. 9 is similar to the embodiment shown in FIGS. 1 to 5 except that several grooves 42 are provided in the rim 41 of the bladder 14 and a corresponding number of flanges 37 are provided in the locking ring 36 for reinforced connection. In addition, the upper edge 29' of the peripheral rim 29 may be rounded as shown.

In the embodiment shown in FIG. 10, no grooves or flanges 42 and 37 are provided, but on the contrary, the upper surface of the bead 43 is conformed to define a rib 51 when uncompressed so that when it is compressed, when the mounting means 25' is tightened, it will be flattened by the action of the lower surface 52 of the locking ring 36.

With this arrangement the zone of maximum compression of the rim 41 is moved further away from the bending zone adjacent the peripheral rim 29 of the bladder and in addition the compressed rib 51 will provide a highly dependable seal, especially when, by reason of the pressure differential between the gas pressure in chamber 15 and the atmosphere will force the rib 51 to be wedged in the corner formed by the disc 25 and the locking ring 36.

With the arrangements above described, secure clamping of the bladder is provided without likelihood of leakage of liquid or gas from the accumulator. Despite the alternate compression and expansion to which the bladder is subjected during operation, since the portion of the bladder engaged by the upper edge of the peripheral rim 29 is under no stress as substantially all the clamping action is taken by the thickened rim 41, there will be no fatigue of the bladder adjacent the rim 29 which is the location where much of the flexing action occurs during use of the accumulator and hence the equipment can operate for long periods of time without likelihood of breakdown due to fatigue of the bladder.

In the event of bladder failure after long use, which necessitates replacement, as the bladder is releasably retained by the clamping means, it may readily be removed and as the same clamping means are available for reuse, the cost of bladder replacement is considerably less than it would be if the clamping means, including the disc and stem were permanently mounted to the bladder.

As many changes could be made in the above constructions, and many apparently widely different embodiments of this invention could be made without departing from the scope of the claims, it is intended that all matter contained in the above description or shown in the accompanying drawings shall be interpreted as illustrative and not in a liimting sense.

Having thus described my invention, what I claim as new and desire to secure by Letters Patent of the United States is:

1. In a pressure vessel of the type having a rigid container with a port and a deformable bladder of resilient material, said bladder having a mouth with inturned annular rim, the combination therewith of clamping means to secure the bladder in the container, said clamping means comprising a disc having a stem rising therefrom and adapted to extend through such port, means coacting with the extending portion of said stem to move said clamping means outwardly, a locking ring encompassing the stem, at least a portion of said locking ring being encompassed by the rim of said partition, said ring coacting with said stem and said disc securely to retain said rim portion in fixed position when said clamping means is moved outwardly thereby clamping said rim, said disc having a peripheral upstanding rim defining the guide means and an annular groove between the peripheral rim and the stem defining an annular shoulder adjacent the stem on which the portion of the locking ring adjacent its inner periphery is adapted to seat, the portion of said stem extending through the port in said container being externally threaded, the height of said locking ring being less than that of said rim when uncompressed, whereby when said bladder rim is compressed the upper surface of said locking ring will abut against the wall of said container to limit the degree of compression of said bladder rim, said peripheral rim being spaced from the wall of said container when said locking ring abuts thereagainst by a distance substantially equal to the thickness of the bladder wall outwardly of the rim of the bladder, the wall of the annular groove adjacent said annular shoulder being inclined, the outer periphery of the locking ring at its inner end extending over said inclined wall of said groove and defining a substantially wedge shaped recess, the free end of said bladder rim defining a bead adapted to be forced into said wedge shaped recess when pressure is applied thereto.

2. The combination set forth in claim 1 in which the portion of the wall of the container engaged by the upper end of the locking ring as well as such upper end are machined to define a metal to metal seal.

3. In a pressure vessel of the type having a rigid container with a port and a deformable bladder of resilient material, said bladder having a mouth with inturned annular rim, the combination therewith of clamping means to secure the bladder in the container, said clamping means comprising a disc having a stem rising therefrom and adapted to extend through such port, means coacting with the extending portion of said stem to move said clamping means outwardly, a locking ring encompassing the stem, at least a portion of said locking ring being encompassed by the rim of said partition, said ring coacting with said stem and said disc securely to retain said rim portion in fixed position when said clamping means is moved outwardly thereby clamping said rim, said disc having a peripheral upstanding rim defining the guide means and an annular groove between the peripheral rim and the stem defining an annular shoulder adjacent the stem on which the portion of the locking ring adjacent its inner periphery is adapted to seat, the portion of said stem extending through the port in said container being externally threaded, the height of said locking ring being less than that of said rim when uncompressed, whereby when said bladder rim is compressed the upper surface of said locking ring will abut against the wall of said container to limit the degree of compression of said bladder rim, said peripheral rim being spaced from the wall of said container when said locking ring abuts thereagainst by a distance substantially equal to the thickness of the bladder wall outwardly of the rim of the bladder, the outer periphery of said locking ring at its inner end extending laterally outward beyond the inner wall of said groove to define a recess therebeneath, the free end of said bladder rim defining a bead adapted to be forced into said recess when pressure is applied to said bead, the annular shoulder being in a plane closer to the undersurface of said disc than the plane of the end of said peripheral rim.

4. In a pressure vessel of the type having a rigid container with a port and a deformable bladder of resilient material, said bladder having a mouth with inturned annular rim, the combination therewith of clamping means to secure the bladder in the container, said clamping means comprising a disc having a stem rising therefrom and adapted to extend through such port, means coacting with the extending portion of said stem to move said clamping means outwardly, a locking ring encompassing the stem, at least a portion of said locking ring being encompassed by the rim of said partition, said ring coacting with said stem and said disc securely to retain said rim portion in fixed position when said clamping means is moved outwardly thereby clamping said rim, said disc having a peripheral upstanding rim defining the guide means and an annular groove between the peripheral rim and the stem defining an annular shoulder adjacent the stem on which the portion of the locking ring adjacent its inner periphery is adapted to seat, the portion of said stem extending through the port in said container being externally threaded, the height of said locking ring being less than that of said rim when uncompressed, whereby when said bladder rim is compressed the upper surface of said locking ring will abut against the wall of said container to limit the degree of compression of said bladder rim, said peripheral rim being spaced from the wall of said container when said locking ring abuts thereagainst by a distance substantially equal to the thickness of the bladder wall outwardly of the rim of the bladder, the wall of the annular groove adjacent said annular shoulder being inclined, the outer wall of the locking ring adjacent its upper surface being inclined outwardly from its upper portion toward its lower portion to define a wedge shaped recess with respect to the adjacent wall of the container, the upper rim portion of the bladder being forced into said wedge shaped recess when pressure is applied thereto.

5. As an article of manufacture, a bladder of resilient deformable material having a mouth with a re-entrant rim, the free end of said rim having an inwardly extending lateral annular bead and a rib formed on the top surface of said bead.

6. As an article of manufacture clamping means for the bladder of a pressure vessel, said bladder being of the type having a re-entrant annular rim, said clamping means comprising a disc having an axial stem rising therefrom and having a peripheral upstanding annular rim, an annular groove in said disc between said peripheral rim and said stem defining a shoulder adjacent the root end of said stem, a locking ring encompassing said stem and adapted to seat on said shoulder, the periphery of said ring extending laterally over the inner periphery of said groove, and being inwardly spaced from the peripheral rim to provide clearance for the rim of the bladder, said ring being of height such that when seated on said shoulder the upper surface of said ring will extend beyond the upper edge of said peripheral rim, the annular shoulder being in a plane closer to the undersurface of said disc than the plane of the end of said peripheral rim.

7. The combination set forth in claim 6 in which said locking ring has an outstanding annular lateral flange at its lower end adapted to be seated in a correspondingly annular groove in the inner wall of said bladder rim.

8. The combination set forth in claim 6 in which said locking ring has an annular rib on its undersurface adjacent its outer periphery.

References Cited by the Examiner
UNITED STATES PATENTS

| | | | |
|---|---|---|---|
| 1,794,192 | 2/1931 | Lower | 264—295 |
| 1,909,726 | 5/1933 | Serenyi | 264—295 |
| 2,380,866 | 7/1945 | Overbeke | 138—30 |
| 2,550,892 | 5/1951 | Weber et al. | 138—30 |
| 2,792,022 | 5/1957 | Mercier | 138—30 |
| 2,877,801 | 3/1959 | Mercier | 138—30 |
| 2,878,834 | 3/1959 | Mercier | 138—30 |
| 2,886,064 | 5/1959 | Mercier | 138—30 |

LAVERNE D. GEIGER, *Primary Examiner.*

LEWIS J. LENNY, EDWARD V. BENHAM,
*Examiners.*